UNITED STATES PATENT OFFICE.

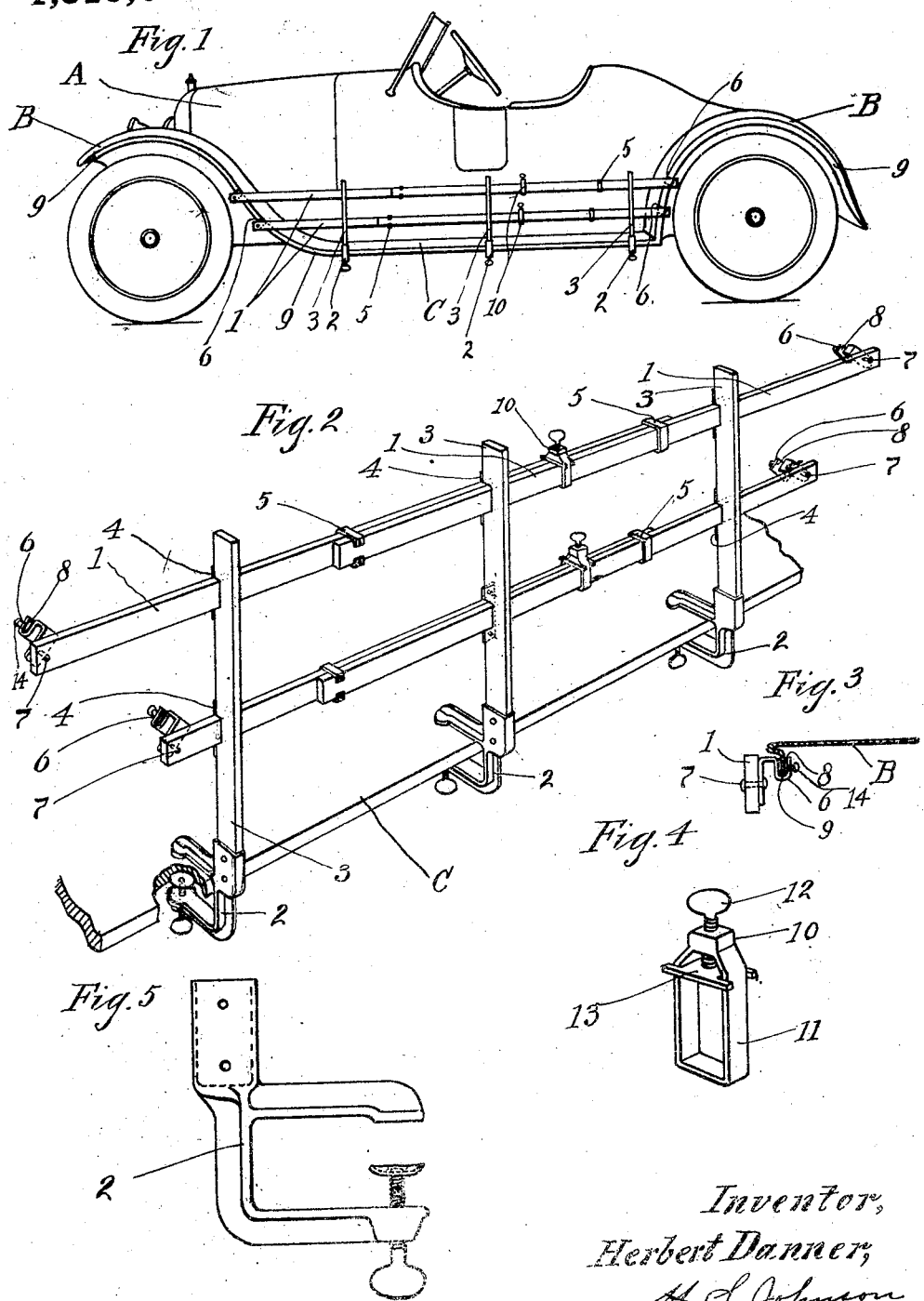

HERBERT DANNER, OF ST. PAUL, MINNESOTA.

CARRIER ATTACHMENT FOR AUTOMOBILES.

1,315,657.  Specification of Letters Patent.  Patented Sept. 9, 1919.

Application filed November 25, 1918. Serial No. 263,973.

*To all whom it may concern:*

Be it known that I, HERBERT DANNER, a citizen of the United States, residing at St. Paul, 216 West Congress St., in the county of Ramsey and State of Minnesota, have invented certain new and useful Improvements in Carrier Attachments for Automobiles, of which the following is a specification.

This invention relates to improvements in carrier attachments for automobiles, and more particularly to the type used in connection with running boards. An object of the invention is to provide closure means conveniently attachable to the running board of an automobile, whereby the entire space above the running board between the mud guard or fender over the front and rear wheels may be rendered available for carrier purposes. A further object is to provide a carrier device, neat in appearance and that may be produced at small cost.

The invention consists in the construction, combination, and arrangement of parts hereinafter described and claimed.

Figure 1 is a perspective view of an automobile equipped with the invention.

Fig. 2 is a perspective view of the invention alone.

Fig. 3 is a fragmentary sectional view through the mud guard, showing a method of attaching the invention thereto.

Fig. 4 is a perspective view of one of the rail clamps, and

Fig. 5 is a side elevation of the clamp at the base of the upright.

Referring to the drawings A represents an automobile and B the mud guards or fenders thereof. C represents the running board connected at its ends to the front and rear mud guards respectively.

The mud guards B which are customarily rigidly mounted on the frame of the vehicle over the wheels, are curved to conform to the periphery of the latter and arranged concentric therewith, each guard in extent being a segment of a circle, suitably modified in curvature at one extremity to render it conveniently connectible with the end of the running board C.

The running board is customarily designed to lie in a horizontal plane below the axles of the vehicle, and is of a width equal to that of the guards, so as to form a continuous flush outer edge of a pocket thus formed between the front and rear wheels.

Applicant's invention comprises one or more extensible rails 1, extending from the front to the rear mud guard and attachable to both so as to rail-in the above named pocket space to render it available for holding parcels and the like.

Removably attached to the running board by means of a thumb screw clamp 2, forming its base, is the upright 3, of which there may be any desired number.

The uprights 3, have in their inner edges suitable notches bridged by plates 4, to form openings to horizontally and slidably receive rails 1. Each rail comprises two overlapping parts held in longitudinal slidable relationship by the bands 5, each of said parts having at its outer end a clip 6, mounted on a pivot 7, around which it may be turned. The clip is formed with a cleft 8, opening outwardly and adapted to receive the usual downturned flange 9, of the mud guards.

The cleft as shown is lined with a soft material such as felt, to avoid undue abrasion of the parts. In use, the device is clamped on the edge of the running board, the uprights being suitably separated to divide the outward thrust of the contained merchandise. The rails are then extended and the clips turned upon their pivots until the opening of the cleft 8, is brought into register with the flange 9, when it may be slipped over the latter, the pivot 7 permitting the clip to be driven home over the flange at any point on the guard regardless of the angle of its curvature. When the clips have been adjusted the rail clamps 10, are fastened, the latter comprising a rail receiving loop 11, provided with a thumb screw 12, and a follower plate 13, whereby the coöperating parts of the rail may be pressed against the bottom of the loop to be held against longitudinal movement.

Thus, the rails are adaptable to engage mud guards of varying curvature and to connect the latter in vehicles having different lengths of thread. The clips 6, are provided with set screws 14, which may be used when the intermediate supporting uprights 3, are not used. When this is the case, the clips are set-screwed in position on the fenders, the rails 1, spanning the gap between the front and rear fenders.

I claim:

1. In a carrier attachment of the class described, the combination with the upwardly curved mud guard and the running board of an automobile, a mud guard at each end of the running board, and projecting above the latter, of uprights on the outer edge of the running board, horizontal independently extensible rails one above the other, slidably supported in said uprights, and means on each of the rails, for engaging at the respective levels of the latter, said mud guards for the purpose set forth.

2. In a carrier device of the class described the combination with the running board and the upwardly curved front and rear fenders adjacent respectively to the front and rear end of said running board, and projecting above the latter, of uprights on the running board, and horizontal extensible rails, one above the other, slidably supported on said uprights, each of the rails being independently extensible and independently slidable in said uprights, so as to span at their respective levels, the horizontal distance between said fenders.

3. In a carrier attachment for automobiles, the combination with the upwardly and outwardly curved fenders at each end of the running board, and projecting above the latter, a longitudinally adjustable rack on the running board between the fenders and fitting at its ends the curvature of the latter, said rack comprising a plurality of horizontal independently extensible rails, one above the other, and means for holding the rails in extended position.

4. In a device of the class described, the combination with the running board and the front and rear upwardly and outwardly curved wheel fender at either end thereof, each fender having a downwardly extending flange along its outer curved edge, of a plurality of horizontal independently extensible rails, arranged one above the other between said front and rear fenders, uprights on the running board to hold said rails in spaced relation, and fastening means at the end of each of the rails to engage said flange to connect the fenders together, said means comprising a clip adapted to rotate in a vertical plane and bent to form an outwardly opening jaw to receive the flange of the fender.

In testimony whereof I affix my signature in presence of two witnesses.

HERBERT DANNER.

Witnesses:
GEORGE VOELKER,
JULIA FISKE.